US012731751B2

(12) United States Patent
Zhang et al.

(10) Patent No.: US 12,731,751 B2
(45) Date of Patent: Sep. 8, 2026

(54) KLYSTRONS AND MEDICAL ELECTRON LINEAR ACCELERATORS

(71) Applicant: SHANGHAI UNITED IMAGING HEALTHCARE CO., LTD., Shanghai (CN)

(72) Inventors: Zhaolong Zhang, Shanghai (CN); Liuyuan Zhou, Shanghai (CN); Jisen Yang, Shanghai (CN); Gang Pan, Shanghai (CN); Zhaopeng Feng, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 220 days.

(21) Appl. No.: 18/629,887

(22) Filed: Apr. 8, 2024

(65) Prior Publication Data

US 2024/0339281 A1 Oct. 10, 2024

(30) Foreign Application Priority Data

Apr. 8, 2023 (CN) ......................... 202310370101.7

(51) Int. Cl.

*H01J 25/10* (2006.01)
*H01J 23/12* (2006.01)
*H05H 7/02* (2006.01)

(52) U.S. Cl.

CPC .............. *H01J 25/10* (2013.01); *H01J 23/12* (2013.01); *H01J 2223/12* (2013.01); *H01J 2225/10* (2013.01); *H05H 7/02* (2013.01); *H05H 2007/027* (2013.01); *H05H 2277/11* (2013.01)

(58) Field of Classification Search

CPC .. H01J 25/10; H01J 25/14; H01J 23/12; H01J 2223/12; H01J 2225/10; H05H 7/02; H05H 7/22; H05H 2007/027; H05H 2277/11

See application file for complete search history.

(56) References Cited

U.S. PATENT DOCUMENTS

| | | | | |
|---|---|---|---|---|
| 4,591,799 A * | 5/1986 | Faillon | H01J 25/10 330/45 |
| 2013/0015763 A1* | 1/2013 | Scheitrum | H01J 25/10 315/5.41 |

FOREIGN PATENT DOCUMENTS

CN 111312571 A 6/2020

OTHER PUBLICATIONS

Sun, Peng, Research on X-band high power multi-beam klystron, 2007, 116 pages.

* cited by examiner

*Primary Examiner* — Jeffrey M Shin
(74) *Attorney, Agent, or Firm* — METIS IP LLC

(57) ABSTRACT

A klystron is provided. The klystron comprises an output cavity, an output waveguide, and a coupling port, the output waveguide is connected to a side wall of the output cavity through the coupling port, an additional cavity is provided on the side wall of the output cavity, the additional cavity is connected with the output cavity and extends from a position connected to the output cavity in a direction away from a central axis of the output cavity.

19 Claims, 13 Drawing Sheets

KLYSTRONS AND MEDICAL ELECTRON LINEAR ACCELERATORS

CROSS-REFERENCE TO RELATED APPLICATIONS

This application claims priority of Chinese Patent Application No. 202310370101.7 filed on Apr. 8, 2023, the contents of which are incorporated herein by reference.

TECHNICAL FIELD

The present disclosure relates to the field of microwave device technology, and in particular, to klystrons and medical electron linear accelerators.

BACKGROUND

A klystron is a type of microwave electron tube that utilizes the periodic modulation of electron beam velocity to achieve oscillation or amplification. In an output cavity of the klystron, an electric field (referred to as an electric field of the output cavity) in a gap of a drift tube near a coupling port is stronger than other regions of the output cavity, resulting in a higher characteristic impedance at the gap, which affects the stability of an electron beam and the efficiency of the klystron. Therefore, achieving a more uniform electric field distribution in the output cavity is an urgent technical problem in this field.

SUMMARY

An aspect of the present disclosure relates to a klystron comprising: an output cavity, an output waveguide, and a coupling port, the output waveguide being connected to a side wall of the output cavity through the coupling port, wherein an additional cavity is provided on the side wall of the output cavity, the additional cavity is connected with the output cavity and extends from a position connected to the output cavity in a direction away from a central axis of the output cavity.

A further aspect of the present disclosure relates to a klystron comprising: an output cavity, an output waveguide, and a coupling port, the output cavity being connected to the output waveguide through the coupling port, wherein the output cavity comprises a first space and a second space, the first space is configured for movement of electron beam, the second space deviates from a movement path of the electron beam, and protrudes outward from a side wall of the output cavity.

A still further aspect of the present disclosure relates to a medical electronic linear accelerator comprising: a klystron, wherein the klystron comprises an output cavity, an output waveguide, and a coupling port, the output waveguide is connected to a side wall of the output cavity through the coupling port, wherein an additional cavity is provided on the side wall of the output cavity, the additional cavity is connected with the output cavity and extends from a position connected to the output cavity in a direction away from a central axis of the output cavity.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

REFERENCE NUMERALS AND REPRESENTED STRUCTURES

Figure 1A:
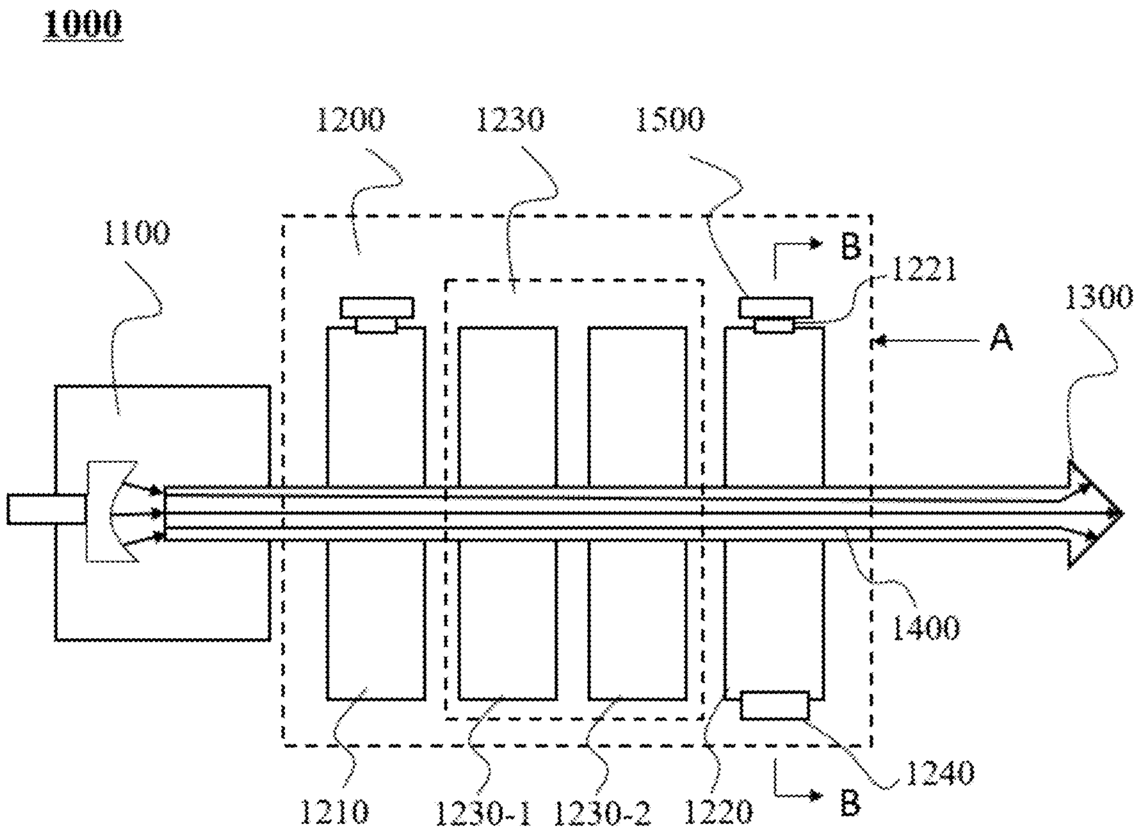
FIG. 1*a* is a schematic diagram illustrating a structure of an exemplary klystron according to some embodiments of the present disclosure.

1000—klystron; 1100—electron gun; 1200—resonator cavity; 1210—input cavity; 1220—output cavity; 1221—coupling port; 1224—telescopic structure; 1230—intermediate cavity; 1230-1—intermediate cavity; 1230-2—intermediate cavity; 1240—additional cavity; 1241—first additional cavity; 1242—second additional cavity; 1300—collector electrode; 1400—drift tube; 1500—output waveguide;

2000—klystron; 2100—electron gun; 2200—resonant cavity; 2210—input cavity; 2220—output cavity; 2221—coupling port; 2230—intermediate cavity; 2230-1—intermediate cavity; 2230-2—intermediate cavity; 2240—additional cavity; 2300—collector electrode; 2400—drift tube; 2500—output waveguide;

4220—output cavity; 4221—coupling port;

6220—output cavity; 6224—telescopic structure; 6241—first additional cavity; 6242—second additional cavity;

7220—output cavity; 7221—coupling port; 7242—second additional cavities;

9220—coaxial cavity; 9400—multiple electron beam channels; 10220—recessed re-entrant cavity; 10400—multiple electron beam channels; 11200—cylindrical cavity; 11400—multiple electron beam channels.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

FIG. 1*a* is a schematic diagram illustrating a structure of an exemplary klystron 1000 according to some embodiments of the present disclosure. As shown in FIG. 1*a*, the klystron 1000 may include an electron gun 1100, a resonant cavity 1200, a collector electrode 1300, and a drift tube 1400.

A high-voltage electric field in the electron gun 1100 may accelerate an electron beam to emit the electron beam towards the drift tube 1400. The drift tube 1400 is a channel for a movement of the electron beam and the electron beam may undergo bunching in the drift tube 1400. The resonant cavity 1200 may modulate the electron beam (e.g., velocity modulation or density modulation) to induce the bunching of the electron beam during the movement of the electron beam.

In some embodiments, the resonant cavity 1200 may include an input cavity 1210 and an output cavity 1220. The input cavity 1210 may perform the velocity modulation on the electron beam. In some embodiments, the input cavity 1210 may have a coupling loop. At the coupling loop, a microwave signal that is inputted by a high-frequency signal may be fed into the accelerated electron beam emitted by the electron gun 1100, forming a microwave signal voltage at a gap of the resonant cavity 1200, thereby achieving the velocity modulation of the electron beam.

Figure 2:
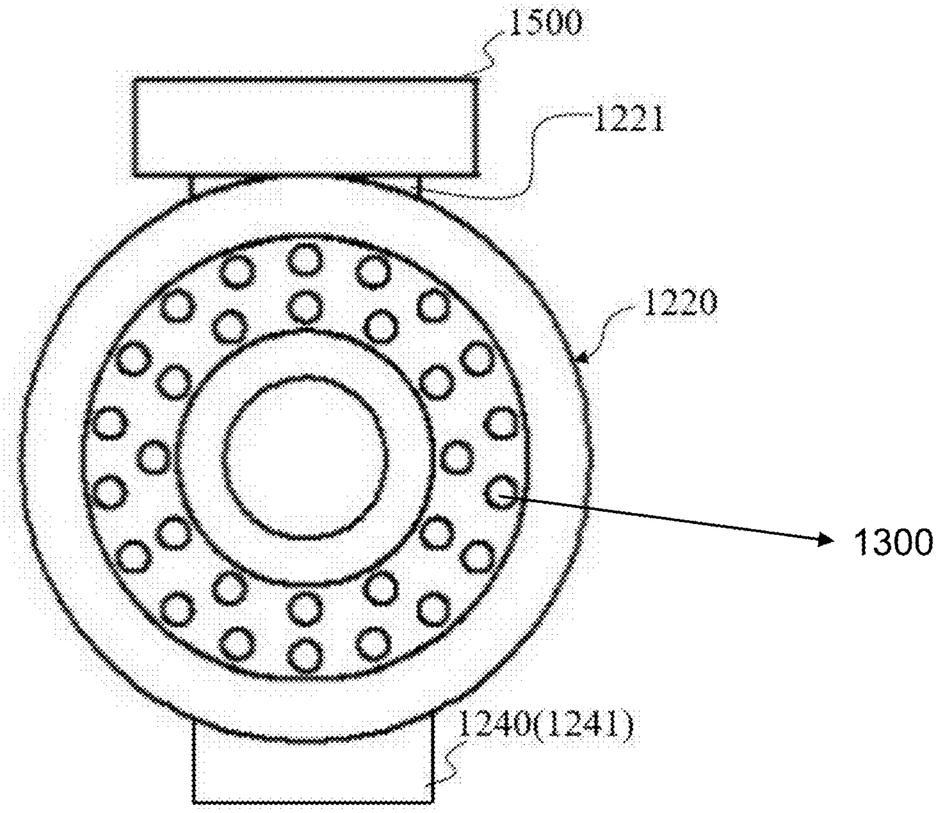
FIG. 2 is a view of an output cavity of the klystron shown in FIG. 1*a* in a direction of A.

In some embodiments, the output cavity 1220 may include an output waveguide 1500 and a coupling port 1221. The output cavity 1220 may transmit signals through the coupling port 1221 and the output waveguide 1500. For example, the output cavity 1220 may transmit the microwave signal through the coupling port 1221 and the output waveguide 1500. The coupling port 1221 may be an interface structure, connecting the output waveguide 1500 and the output cavity 1200, so that the microwave signal in the output cavity 1200 may be transmitted to the output waveguide 1500 through the coupling port 1221. Then, the microwave signal may be transmitted to a device (e.g., a medical electronic linear accelerator) that requires the microwave signal through the output waveguide 1500. The output waveguide refers to a component that can output electromagnetic waves to other devices. For example, the output waveguide 1500 may be connected to a side wall of the output cavity 1220 through the coupling port 1221. Specifically, the output waveguide 1500 may be connected to a circumferential side wall of the output cavity 1220 through the coupling port 1221. In some embodiments, the output cavity 1220 may have a cylindrical shape, such as a circular cylinder (as shown in FIG. 2), an elliptical cylinder, a square cylinder, etc. Merely by way of example, the output cavity 1220 may be a cavity structure.

The resonant cavity 1200 may further include at least one intermediate cavity 1230 (e.g., an intermediate cavity 1230-1, an intermediate cavity 1230-2) located between the input cavity 1210 and the output cavity 1220. In some embodiments, shapes and geometrical dimensions of a plurality of intermediate cavities 1230 may be the same or different. For example, as shown in FIG. 1*a*, the shapes and geometrical dimensions of the intermediate cavity 1230-1 and the intermediate cavity 1230-2 may be the same.

The collector electrode 1300 may be used to collect electrons. When the electrons passing through the resonant cavity 1200 (e.g., the input cavity 1210 and the output cavity 1220) strike the collector electrode 1300, remaining kinetic energy of the electrons may be converted into heat energy.

The operation principle of the klystron 1000 is as follows. The electron beam accelerated by the electron gun 1100 enters the drift tube 1400, and is first velocity-modulated in the input cavity 1210. The velocity-modulated electron beam, under an action of the intermediate cavity, undergoes electron bunching during a drift process in the drift tube 1400, thereby achieving the density modulation of the electron beam. The density-modulated electron beam exchanges energy with a microwave field at a gap of the output cavity 1220, and the electrons transfer their energy to the microwave field to complete the function of amplification or oscillation. Subsequently, the electrons are collected by the collector electrode 1300.

It should be noted that the above description of the klystron 1000 is merely provided for the purposes of illustration, and not intended to limit the scope of the present disclosure. For persons having ordinary skills in the art, multiple variations and modifications may be made under the teachings of the present disclosure. For example, the klystron 1000 may include one or more additional components and/or one or more components of the klystron 1000 described above may be omitted. As another example, a count of the intermediate cavities 1230 and a distance between adjacent two intermediate cavities 1230 may be the same or different. However, such variations and modifications remain within the scope of the present disclosure.

Figure 1B:
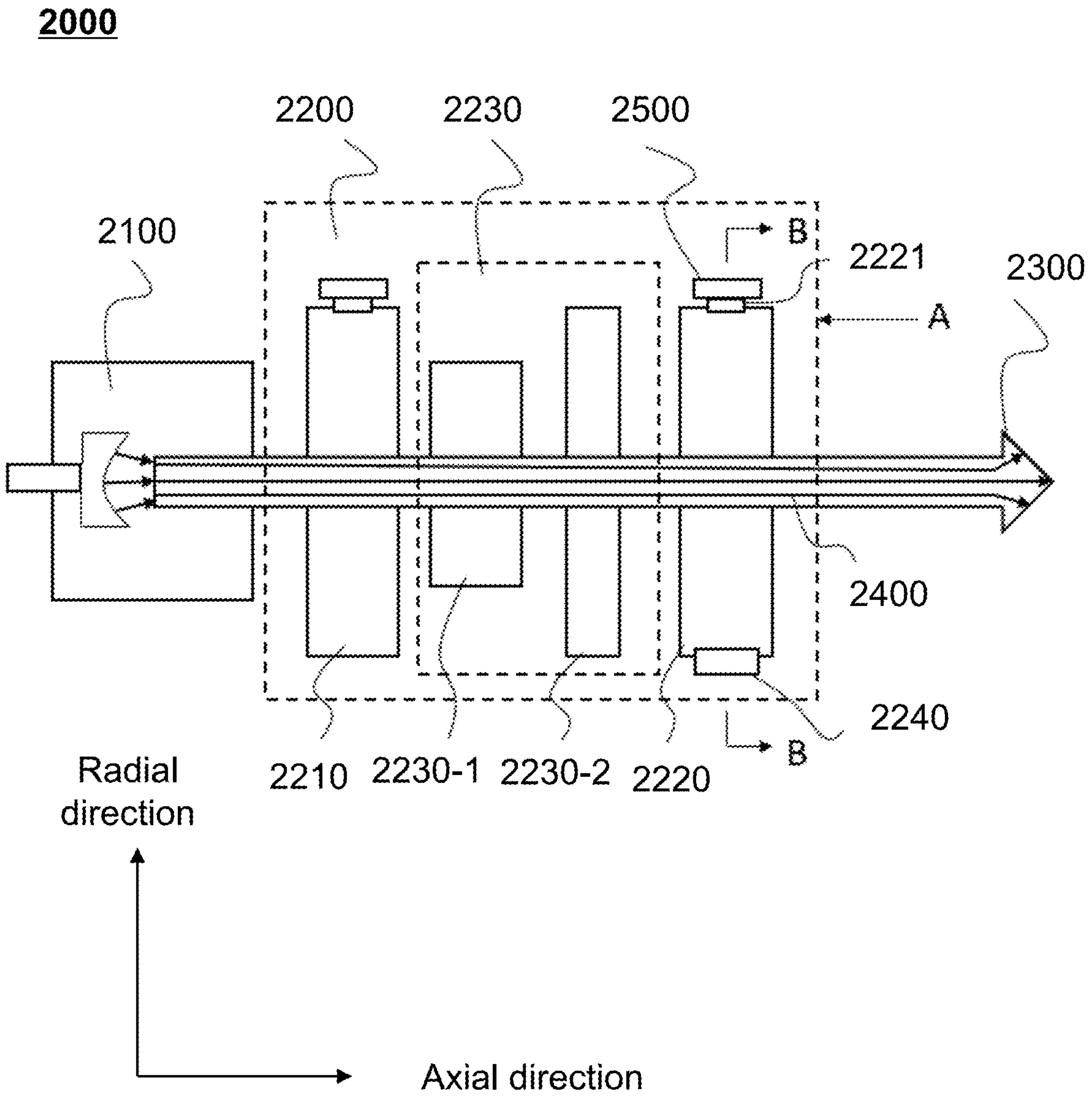
FIG. 1*b* is a schematic diagram illustrating a structure of an exemplary klystron according to some embodiments of the present disclosure.

FIG. 1*b* is a schematic diagram illustrating a structure of an exemplary klystron 2000 according to some embodiments of the present disclosure. As shown in FIG. 1*b*, the klystron 2000 may include an electron gun 2100, a resonant cavity 2200, a collector electrode 2300, and a drift tube 2400. The resonant cavity 2200 may include an input cavity 2210 and an output cavity 2220. The output cavity 2220 may include an output waveguide 2500 and a coupling port 2221. The resonant cavity 2200 may further include at least one intermediate cavity 2230 located between the input cavity 2210 and the output cavity 2220. In some embodiments, the klystron 2000 may be an exemplary embodiment of the klystron 1000 illustrated in FIG. 1*a*. In some embodiments, the klystron 2000 may be an exemplary independent embodiment of the klystron described in the present disclosure.

In some embodiments, as shown in FIG. 1*b*, a plurality of intermediate cavities 2230 may include an intermediate cavity 2230-1 and an intermediate cavity 2230-2. The intermediate cavity 2230-1 and the intermediate cavity 2230-2 may have different shapes and geometric dimensions. For example, as shown in FIG. 1*b*, relative to the intermediate cavity 2230-2, the intermediate cavity 2230-1 may have a smaller radial length, and relative to the intermediate cavity 2230-1, the intermediate cavity 2230-2 may have a smaller axial length (thickness). The geometric dimensions and shapes of the intermediate cavity 1230-1, the intermediate cavity 1230-2, the intermediate cavity 2230-1, and the intermediate cavity 2230-2 described herein are provided for illustrative purpose only and may be determined based on actual requirements (such as a microwave frequency, an output power, etc.). Intermediate cavities with different geometric dimensions and/or shapes correspond to different inherent resonant frequencies. Intermediate cavities with different resonant frequencies have different effects on the bunching of the electron beam and the uniformity of an electric field distribution in the output cavity (e.g., the output cavity 1220, the output cavity 2220).

In some embodiments, an additional cavity may be provided on a side wall of the output cavity. It can be understood that the setting of the coupling port may cause the position with the highest electric field intensity in the output cavity to shift from the central area of the output cavity to the coupling port. The setting of the additional cavity 1240 may change the shape of the output cavity, causing the position with the highest electric field intensity in the output cavity to shift towards the additional cavity, returning to the central area of the output cavity to offset the influence of the coupling port on the electric field distribution in the output cavity. For example, as shown in FIG. 1*a*, an additional cavity 1240 is provided on the side wall of the output cavity 1220. As another example, as shown in FIG. 1*b*, an additional cavity 2240 is provided on the side wall of the output cavity 2220. In some embodiments, the additional cavity (e.g., the additional cavity 1240, the additional cavity 2240) may be connected with the output cavity (e.g., the output cavity 1220, the output cavity 2220) and extends from a position connected to the output cavity in a direction away from a central axis of the output cavity (i.e., outwardly extending from the output cavity 1220). Specifically, the additional cavity may be a cavity structure located on the side wall of the output cavity and connected with the output cavity. For example, an opening may be formed on the side wall of the output cavity, and the additional cavity may be connected with the output cavity through the opening. A side wall of the additional cavity may be connected to the side wall of the output cavity. For example, the side wall of the additional cavity may be connected to the side wall of the output cavity in a circumferential direction. As a non-limiting example, the additional cavity and the output cavity can be integrally formed. For example, by the way of molding or cutting, the output cavity is formed, which includes the output port (e.g., the output waveguide, the coupling port, etc.), the body and the additional portion that acts as the additional cavity (i.e., the output cavity can be a part of the output cavity). As another non-limiting example, the additional cavity and the output cavity can be welded together. For example, the additional cavity and the output cavity are formed independently by molding or cutting and then welded together.

In some embodiments, areas of cross-sections, perpendicular to an axial direction (as shown in FIG. 1*b*) of the output cavity, of the additional cavity (e.g., the additional cavity 1240, the additional cavity 2240) at different positions along the axial direction of the output cavity may be different. For example, the areas can vary linearly (e.g., gradually increase) or nonlinearly (e.g. increase first and then decrease). Merely by way of example, when the output cavity is circular cylinder, a size of the additional cavity along a radial direction (as shown in FIG. 1*b*) of the output cavity may vary (e.g., gradually increase).

In some embodiments, a length of the additional cavity (e.g., the additional cavity 1240, the additional cavity 2240) along the axial direction of the output cavity (e.g., the output cavity 1220, the output cavity 2220) may be substantially the same as a length of the output cavity along its axial direction. In some embodiments, the length of the additional cavity along the axial direction of the output cavity may be less than the length of the output cavity along its axial direction.

In some embodiments, the size of the additional cavity may be substantially the same as a size of the coupling port. Specifically, a deviation between the size of the additional cavity (e.g., the additional cavity 1240, the additional cavity 2240) and the size of the coupling port (e.g., the coupling port 1221, the coupling port 2221) may be less than or equal to a preset threshold. The preset threshold may be set based on experience or requirements. In some embodiments, the preset threshold may be less than 20%. For example, the preset threshold may be 20%, 10%, 5%, 3%, 1%, 0, etc. For instance, the length of the additional cavity along the axial direction of the output cavity may be equal to a length of the coupling port along the axial direction of the output cavity. By setting the deviation between the size of the additional cavity and the size of the coupling port to be less than or equal to the preset threshold, the ability of the additional cavity to adjust the electric field distribution in the output cavity is improved, resulting in a more uniform electric field distribution in the output cavity (i.e., substantially centrally symmetric relative to the center of the output cavity), thereby enhancing the stability and modulation performance of the klystron.

The additional cavity (e.g., the additional cavity 1240, the additional cavity 2240) may be configured to adjust the electric field distribution in the output cavity (e.g., the output cavity 1220, the output cavity 2220). In some embodiments, the additional cavity is configured to cause a position where an electric field intensity in the output cavity is maximum to move towards the additional cavity. Specifically, due to the arrangement of the additional cavity, a shape of an outer wall of an entire output assembly (i.e., the output cavity and the additional cavity) may be changed, thereby altering the position where the electric field intensity in the output cavity is maximum. For example, when the output cavity is a coaxial cavity, ideally, the position where the electric field intensity in the output cavity is maximum should be in a central region of the output cavity. However, due to the presence of the coupling port, the position of maximum electric field intensity in the output cavity may deviate from the central region towards the coupling port (i.e., located between the central region and the coupling port), resulting in an asymmetric electric field distribution in the output cavity. The electric field forces acting on each electron beam channel are different, and the electric field distribution is uneven (that is, not centrally symmetric relative to the center of the output cavity).

The arrangement of the additional cavity shifts the position of maximum electric field intensity in the output cavity towards the additional cavity, thereby counteracting an influence of the coupling port on the electric field distribution in the output cavity, which makes the position of maximum electric field intensity in the output cavity to return to the central region, Then, the electric field distribution in the output cavity exhibits axial symmetry, and the electric field forces acting on each electron beam channel are roughly the same, the electric field distribution of the klystron more uniform, thereby effectively enhancing the stability of the electron beam and the efficiency of the klystron.

In some embodiments, the additional cavity (e.g., the additional cavity 1240, the additional cavity 2240) may include a first additional cavity. The first additional cavity and the coupling port (e.g., the coupling port 1221, the coupling port 2221) are located opposite to each other on two sides of the central axis of the output cavity (e.g., the output cavity 1220, the output cavity 2220). For example, when the output cavity is the circular cylinder (as shown in FIG. 2), the first additional cavity and the coupling port may be located at two ends of the output cavity along a radial direction of the output cavity. As another example, when the output cavity is the elliptical cylinder, the first additional cavity and the coupling port may be located at two ends of the output cavity along a long axis direction or a short axis direction of the output cavity. By providing the first additional cavity, the electric field distribution in a first radial direction of the output cavity becomes more uniform, resulting in a more uniform electric field distribution in the output cavity, thereby enhancing the stability and modulation performance of the klystron. The first radial direction may be a direction perpendicular to the central axis of the output cavity.

Figure 3:
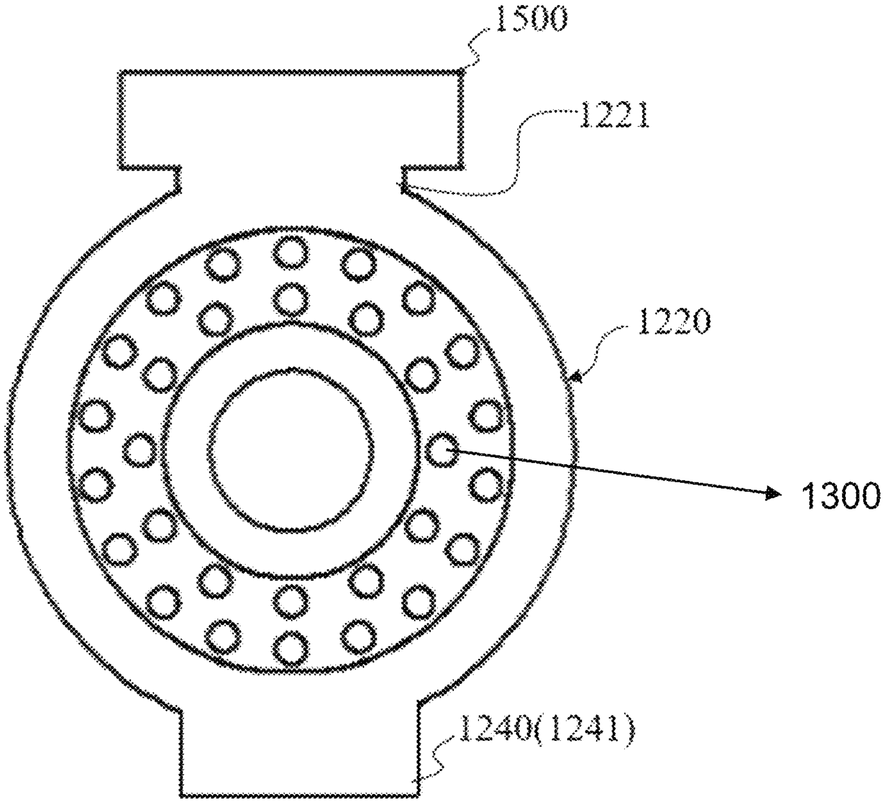
FIG. 3 is a view of the output cavity of the klystron shown in FIG. 1*a* in a direction of B-B.

FIG. 2 is a view of the output cavity 1220 of the klystron 1000 shown in FIG. 1*a* in a direction of A, and FIG. 3 is a view of the output cavity 1220 of the klystron 1000 shown in FIG. 1*a* in a direction of B-B. As shown in FIG. 2 and FIG. 3, the output cavity 1220 is a cylindrical coaxial cavity, and the additional cavity 1240 (e.g., a first additional cavity 1241) is arranged on the side wall of the output cavity 1220. The first additional cavity 1241 and the coupling port 1221 are located opposite to each other on the side wall of the output cavity 1220 along a radial direction of the output cavity 1220. As shown in FIG. 3, the first additional cavity 1241 is connected with the output cavity 1220 and extends from a position connected to the output cavity 1220 in a direction away from the central axis of the output cavity 1220. As shown in FIG. 2 and FIG. 3, a length of the first additional cavity 1241 along the radial direction of the output cavity 1220 may be equal to a length of the coupling port 1221 along the radial direction of the output cavity 1220.

Figure 4:
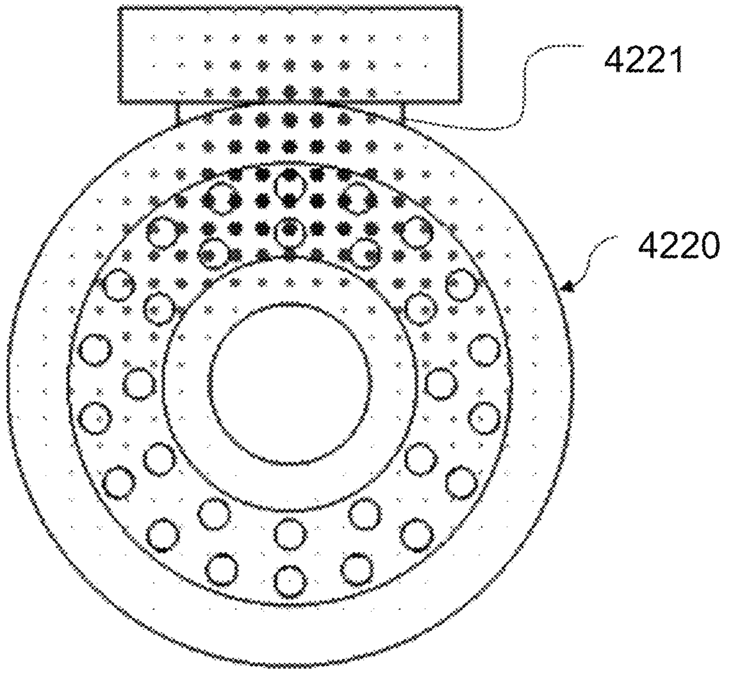
FIG. 4 is a schematic diagram illustrating an electric field distribution in an output cavity without a first additional cavity according to some embodiments of the present disclosure.

FIG. 4 is a schematic diagram illustrating an electric field distribution in an output cavity 4220 without a first additional cavity according to some embodiments of the present disclosure. In some embodiments, the output cavity 4220 may be an exemplary embodiment of the output cavity 1220 illustrated in FIG. 1*a* or the output cavity 2220 illustrated in FIG. 1*b*. In some embodiments, the output cavity 4220 may be an exemplary independent embodiment of the output cavity described in the present disclosure.

FIG. 4 illustrates the electric field distribution in the output cavity 4220 when the first additional cavity is not provided. The size of the solid black dots in FIG. 4 represents an intensity of an electric field. The larger the solid black dots are, the stronger the electric field intensity is. It can be seen from FIG. 4 that when the first additional cavity is not provided, the electric field intensity in a region of the output cavity 4220 near a coupling port 4221 is stronger than other regions of the output cavity 4220. In other words, a position where the electric field intensity is maximum in the output cavity 4220 is near the coupling port 4221. It can be seen from FIG. 4 that when the first additional cavity is not provided, the electric field distribution in the output cavity 4220 is non-uniform. In some embodiments, the coupling port 4221 may be an exemplary embodiment of the coupling port 1221 illustrated in FIG. 1*a* or the coupling port 2221 illustrated in FIG. 1*b*. In some embodiments, the coupling port 4221 may be an exemplary independent embodiment of the coupling port described in the present disclosure.

Figure 5:
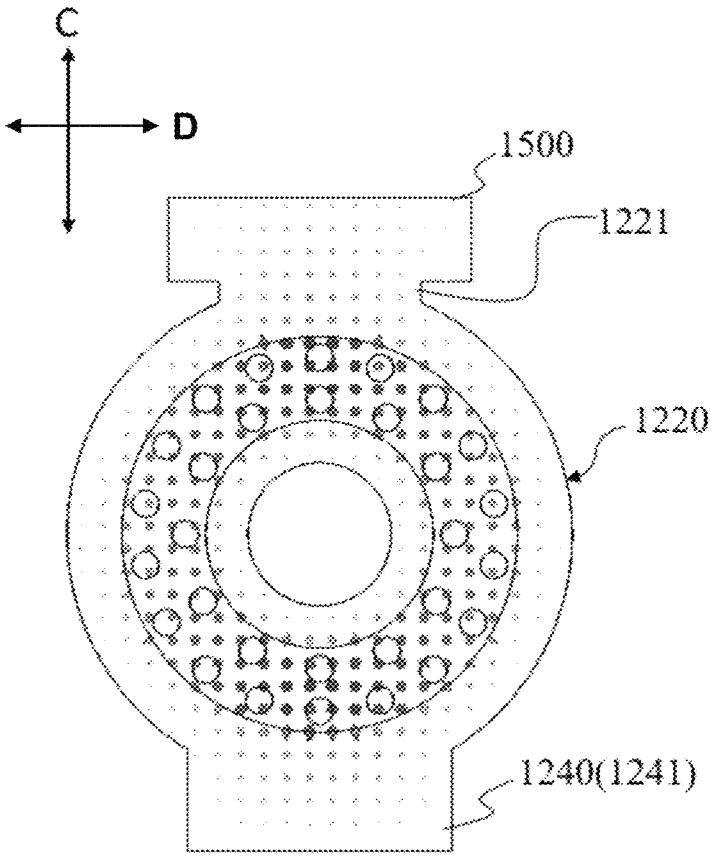
FIG. 5 is a schematic diagram illustrating an electric field distribution in the output cavity shown in FIG. 3.

FIG. 5 is a schematic diagram illustrating an electric field distribution in the output cavity 1220 shown in FIG. 3. The size of the solid black dots in FIG. 5 represents an intensity of an electric field. The larger the solid black dots are, the stronger the electric field intensity is. It can be seen from FIG. 5 that when the first additional cavity 1241 is provided, a position where the electric field intensity in the output cavity 1220 is maximum is located in a central region of the output cavity 1220. Compared to FIG. 4, the electric field distribution in the output cavity 1220 shown in FIG. 5 is more uniform.

In some embodiments, a contour of a cross-section of a side wall of the additional cavity (e.g., the additional cavity 1240, the additional cavity 2240) perpendicular to an axial direction of the output cavity (e.g., the output cavity 1220, the output cavity 2220) may include at least one of a curved line contour or a straight line contour. When the cross-section of the side wall of the additional cavity perpendicular to the axial direction of the output cavity is the curved line contour, and the side wall of the additional cavity protrudes toward the outside of the additional cavity, the curved line contour may further include an arc contour, a wavy linear contour, etc. When the side wall of the additional cavity is a straight line contour, the side wall of the additional cavity includes a plurality of sub-walls. The plurality of sub-walls may be connected in sequence along a circumferential direction of the output cavity, and a contour of a cross-section of each sub-wall of the additional cavity perpendicular to the axial direction of the output cavity is the straight line contour. In some embodiments, as illustrated in FIG. 3, taking the first additional cavity 1241 as an example, the side wall of the first additional cavity 1241 includes three sub-walls, and adjacent sub-walls of the three sub-walls are perpendicular to each other, so that the side wall of the first additional cavity 1241 encloses a rectangular region. In some embodiments, the contours of cross-sections, perpendicular to the axis direction of the output cavity, of the plurality of sub-walls of the output cavity may be the same or different. For example, the contours of the cross-sections, perpendicular to the axis direction of the output cavity, of a portion of the plurality of sub-walls may be the curved line contour, and the contours of the cross-sections, perpendicular to the axis direction of the output cavity, of the other of the plurality of sub-walls may be the straight line contour.

By configuring the contour of the cross-section of the side wall of the additional cavity perpendicular to the axial direction of the output cavity to be the curved line contour or the straight line contour, the manufacturing difficulty of the additional cavity is reduced, thereby effectively minimizing machining errors of the additional cavity, and ensuring the uniformity of the electric field distribution in the output cavity.

In some embodiments, a contour of a cross-section, perpendicular to the axial direction of the output cavity (e.g., the output cavity 1220, the output cavity 2220), of a region enclosed by one or more side walls of the additional cavity (e.g., the additional cavity 1240, the additional cavity 2240) may be polygonal, arcuate, or fan-shaped. The shape of the cross-section, perpendicular to the axis of the output cavity, of the region enclosed by the one or more side walls of the additional cavity refers to: a contour of a closed area enclosed by the side wall of the output cavity and the one or more side walls of the additional cavity by projecting in a direction perpendicular to the axis of the output cavity. That is, on any cross-section perpendicular to the axial direction of the output cavity, a contour of the region enclosed by a line that connects connection points at a junction of the side wall of the additional cavity with a side wall of the output cavity and a line segment presented by the side wall of the additional cavity on the cross-section. For example, when the contour of the cross-section of the side wall of the additional cavity perpendicular to the axial direction of the output cavity is the curved line contour, the contour of the cross-section, perpendicular to the axial direction of the output cavity, of the region enclosed by the side wall of the additional cavity is arcuate. As another example, taking the first additional cavity 1241 shown in FIG. 3 as an example, when the side wall of the first additional cavity 1241 includes three sub-walls, and the contour or shape of the cross-section of each of the three sub-walls perpendicular to the axial direction of the output cavity 1220 is in a straight line shape, the contour or shape of the cross-section, perpendicular to the axial direction of the output cavity 1220, of the region enclosed by the side wall of the additional cavity 1241 is rectangular. As yet another example, the side wall of the additional cavity 1240 has three sub-walls, the contour of the cross-section of one (e.g., a first sub-wall) of the three sub-walls perpendicular to the axial direction of the output cavity is in a curved line shape, and the contours or shapes of the cross-sections of the other two sub-walls (e.g., a second sub-wall and a third sub-wall) perpendicular to the axial direction of the output cavity can be in a straight line shape. The first sub-wall is located between the second sub-wall and the third sub-wall, two sides of the first sub-wall respectively connected to one side of the second sub-wall and one side of the third sub-wall, and the other side of the second sub-wall and the other side of the third sub-wall are connected to the side wall of the output cavity. In such cases, the contour or shape of the cross-section, perpendicular to the axial direction of the output cavity, of the region enclosed by the side wall of the additional cavity is fan-shaped.

By configuring the contour or shape of the cross-section, perpendicular to the axial direction of the output cavity, of the region enclosed by the side wall of the additional cavity to be polygonal, arcuate, or fan-shaped, the manufacturing difficulty of the additional cavity is reduced, thereby effectively minimizing machining errors of the additional cavity, and ensuring the uniformity of the electric field distribution in the output cavity.

In some embodiments, the klystron (e.g., the klystron 1000, the klystron 2000) may include a plurality of output waveguides (e.g., a plurality of output waveguides 1500, a plurality of output waveguides 2500), a plurality of coupling ports (e.g., a plurality of coupling ports 1221, a plurality of coupling ports 2221), and a plurality of additional cavities (e.g., a plurality of additional cavities 1240, a plurality of additional cavities 2240) (e.g., a plurality of additional cavities 1241). The plurality of coupling ports may be arranged in one-to-one correspondence with the plurality of output waveguides. Each of the plurality of coupling ports may be connected to the output cavity at the side wall of the output cavity through a corresponding coupling port. In some embodiments, the plurality of additional cavities may be arranged in one-to-one correspondence with the plurality of coupling ports. In other words, each of the plurality of additional cavities may be located opposite to a corresponding coupling port on the side wall of the output cavity. In some embodiments, the plurality of coupling ports may be evenly spaced along the circumferential direction of the output cavity, and the plurality of additional cavities may be evenly spaced along the circumferential direction of the output cavity. By providing the plurality of output waveguides and the plurality of coupling ports, the klystron can be configured as a multi-port output klystron, so that the signals can be transmitted independently through each coupling port and its corresponding output waveguide, thereby achieving separate processing and adjustment of different input signals. Furthermore, by providing the plurality of first additional cavities, the uniformity of the electric field distribution in the output cavity can be ensured while increasing a count of signal transmission channels.

In some embodiments, as long as the electric field distribution in the output cavity can be uniformly distributed, a position, a shape, and a size of the additional cavity and/or a position, a shape, and a size of the output port may be arbitrarily set. For example, two output ports may be set to correspond to three or more additional cavities; For another example, the plurality of output ports may be set to correspond to an additional cavity. In some embodiments, the additional cavity and the output port may be arranged in positions that deviate from a main plane (i.e., a plane perpendicular to the axial direction).

In some embodiments, the additional cavity (e.g., the additional cavity 1240, the additional cavity 2240) may include at least two second additional cavities. Two of the at least two second additional cavities may be located opposite to each other on two sides of the central axis of the output cavity (e.g., the output cavity 1220, the output cavity 2220). In some embodiments, the two of the at least two second additional cavities may be arranged axially symmetrically around with respect to the output cavity. For example, when the output cavity is the circular cylinder, the two second additional cavities may be located at two ends of the output cavity along the radial direction of the output cavity. As another example, when the output cavity is the elliptical cylinder, the two second additional cavities may be located at two ends of the output cavity along a long axis or a short axis of the output cavity.

In some embodiments, the at least two second additional cavities may be spaced apart along the circumferential direction of the output cavity. In some embodiments, the two of the at least two second additional cavities may be located on two sides of the coupling port (e.g., the coupling port 1221, the coupling port 2221) along the circumferential direction of the output cavity. In some embodiments, the at least two second additional cavities and the coupling port are spaced from each other in a same distance along a circumferential direction of the output cavity, which means the at least two second additional cavities and the coupling port are evenly or equally distributed along the circumferential direction or peripheral direction, ensuring the uniform distribution of effects of the second additional cavities and the coupling port on the electric field in the output cavity, thereby improving the uniformity of the electric field distribution in the output cavity and enhancing the stability and modulation performance of the klystron.

In some embodiments, the additional cavity may simultaneously include the first additional cavity (e.g., the first additional cavity 1241) and the at least two second additional cavities. The two of the at least two second additional cavities may be located on two sides of the first additional cavity in the circumferential direction of the output cavity. Alternatively, the two of the at least two second additional cavities may be located on two sides of the first additional cavity and the coupling port in the circumference of the output cavity. In some embodiments, the at least two second additional cavities and the first additional cavity may be located on the side wall of the output cavity. In some embodiments, the at least two second additional cavities, the coupling port, and the first additional cavity may be evenly spaced along the circumferential direction of the output cavity. It should be noted that the additional cavity may only include the first additional cavity or only include the at least two second additional cavities. By providing the at least two second additional cavities, the electric field distribution in a second radial direction of the output cavity can be made more uniform, thereby improving the uniformity of the electric field distribution in the output cavity and enhancing the stability and modulation performance of the klystron. The second radial direction may be any direction other than the first radial direction. For example, the second radial direction may be a direction angled (e.g., 30 degrees, 45 degrees, 60 degrees, 90 degrees, 120 degrees, etc.) with respect to the first radial direction. By simultaneously providing the first additional cavity and the at least two second additional cavities, the electric field distribution in both the first and the second radial directions of the output cavity can be made more uniform, further improving the uniformity of the electric field distribution in the output cavity and enhancing the stability and modulation performance of the klystron.

Figure 6A:
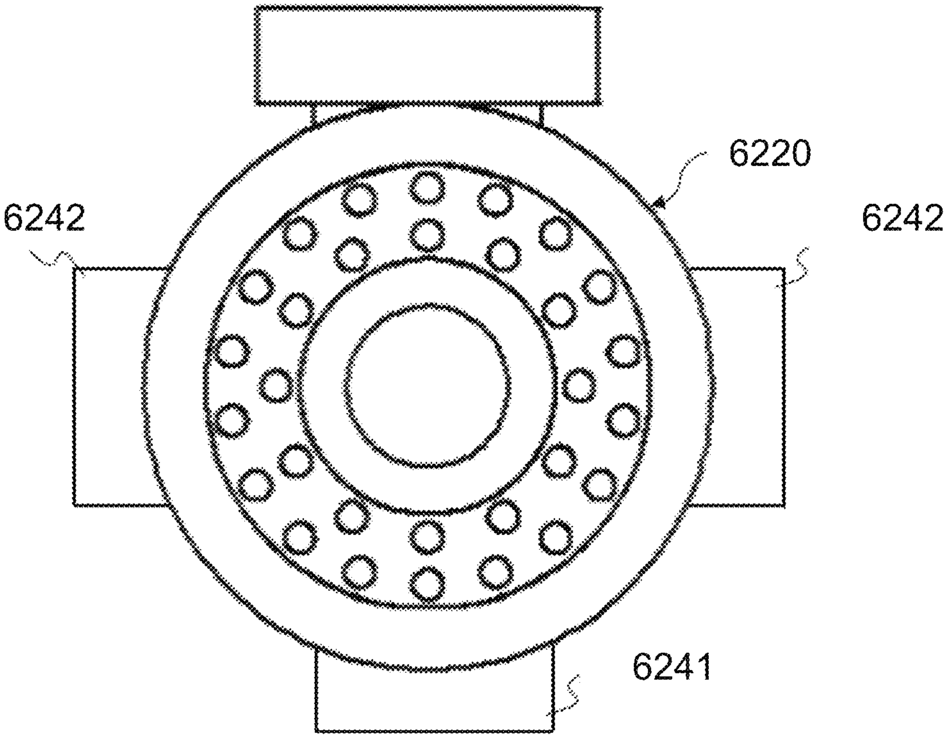
FIG. 6*a* is a schematic diagram illustrating a structure of an exemplary output cavity according to some embodiments of the present disclosure.

FIG. 6*a* is a schematic diagram illustrating a structure of an exemplary output cavity 6220 according to some embodiments of the present disclosure. In some embodiments, the output cavity 6220 may be an exemplary embodiment of the output cavity 1220 illustrated in FIG. 1*a* or the output cavity 2220 illustrated in FIG. 1*b*. In some embodiments, the output cavity 2220 may be an exemplary independent embodiment of the output cavity described in the present disclosure.

As shown in FIG. 6*a*, two second additional cavities 6242 and one first additional cavity 6241 may be simultaneously arranged on a side wall of the output cavity 6220. The two second additional cavities 6242 may be located opposite to each other on the side wall of the output cavity 6220. The two second additional cavities 6242 may be located on two sides of the first additional cavity 6241 along a circumferential direction of the output cavity 6220.

In some embodiments, apart from the first additional cavity 6241 and the two second additional cavities 6242, more additional cavities may be arranged opposite to each other on the side wall of the output cavity 6220. For example, two more additional second cavities may be arranged on the side wall of the output cavity 6220 at positions opposite to each other.

Figure 6B:
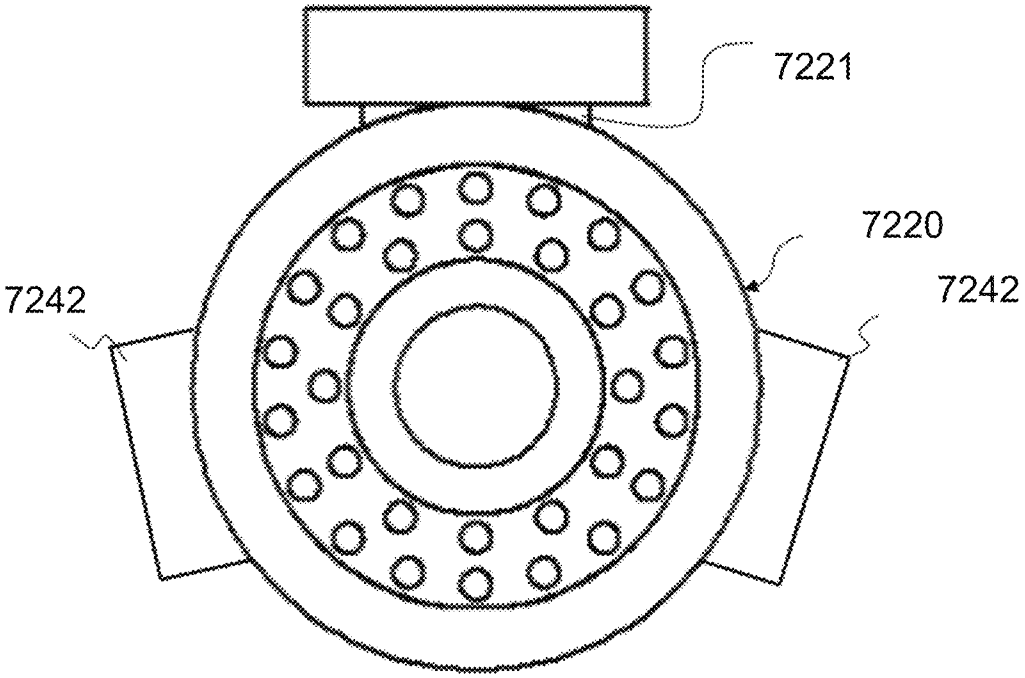
FIG. 6*b* is a schematic diagram illustrating a structure of an exemplary output cavity according to some embodiments of the present disclosure.

FIG. 6*b* is a schematic diagram illustrating a structure of an exemplary output cavity 7220 according to some embodiments of the present disclosure. In some embodiments, the output cavity 7220 may be an exemplary embodiment of the output cavity 1220 illustrated in FIG. 1*a* or the output cavity 2220 illustrated in FIG. 1*b*. In some embodiments, the output cavity 7220 may be an exemplary independent embodiment of the output cavity of the present disclosure.

As shown in FIG. 6*b*, two second additional cavities 7242 are arranged on a side wall of the output cavity 7220. The two second additional cavities 7242 are spaced on a side wall of the output cavity 7220 along a circumferential direction of the output cavity 7220. The two second additional cavities 7242 are located on two sides of a coupling port 7221 along the circumferential direction of the output cavity 7220. In some embodiments, the two second additional cavities 7242 have equal spacing distances in the circumferential direction of the output cavity with respect to the coupling port 7221. For example, an angle (e.g., 120 degrees) between one of the two second additional cavities 7242 and the coupling port 7221 along a radial direction of the output cavity 7220 may be equal to an angle (e.g., 120 degrees) between the other of the two second additional cavities 7242 and the coupling port 7221 along the radial direction of the output cavity 7220. In some embodiments, the coupling port 7221 may be an exemplary embodiment of the coupling port 1221 illustrated in FIG. 1*a* or the coupling port 2221 illustrated in FIG. 1*b*. In some embodiments, the coupling port 7221 may be an exemplary independent embodiment of the coupling port described in the present disclosure.

Figure 7:
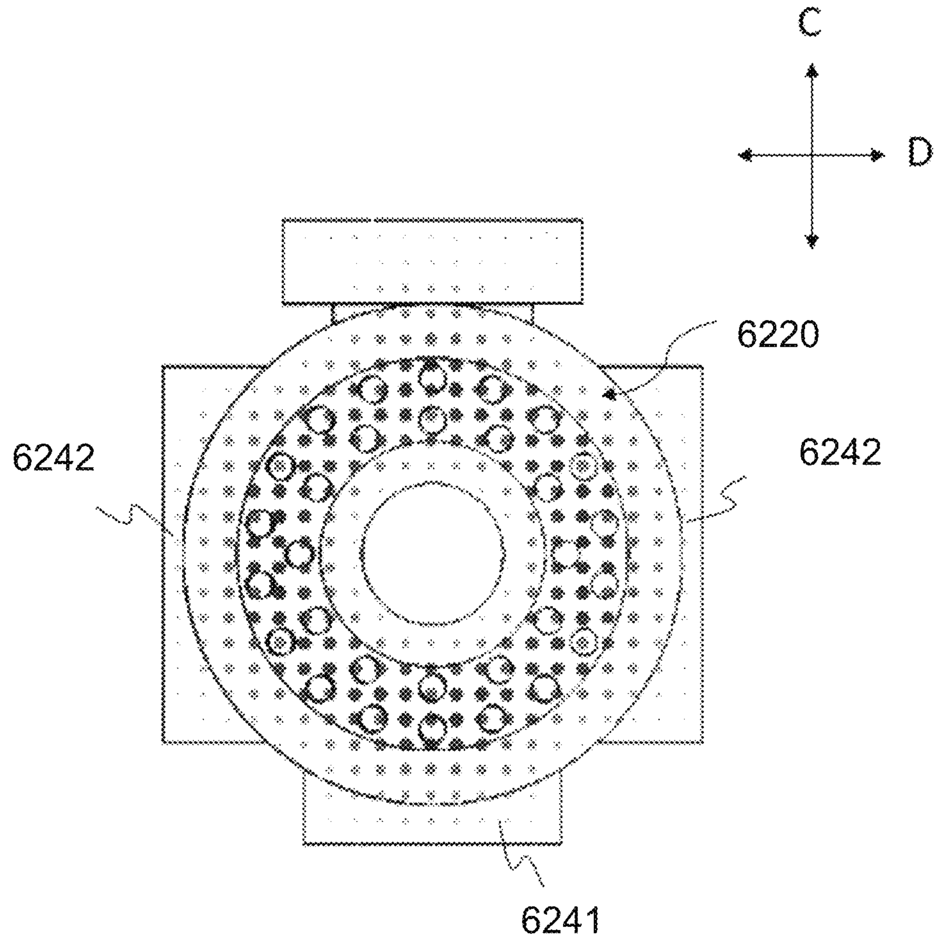
FIG. 7 is a schematic diagram illustrating an electric field distribution in the output cavity shown in FIG. 6*a;*

As mentioned above, the second additional cavity can adjust the electric field distribution of the output cavity. By providing the two second additional cavities, the uniformity of the electric field distribution in the output cavity can be improved. FIG. 7 is a schematic diagram illustrating an electric field distribution of the output cavity 6220 shown in FIG. 6*a*. Comparing FIG. 7 with FIG. 5, it can be seen that the electric field distribution of the output cavity becomes more uniform after arranging the two second additional cavities. Specifically, from FIG. 5, it can be seen that by providing the first additional cavity 1241, the electric field distribution of the output cavity 1220 becomes uniform in a direction C. From FIG. 7, it can be seen that by providing the first additional cavity 6241 and the second additional cavity 6242, the electric field distribution of the output cavity 6220 becomes uniform in directions C and D. As shown in FIG.

5, when only the first additional cavity 1241 is provided, there is a strong electric field in a central region of the output cavity 1220 in the direction D, while the electric field is weak in an edge region in the direction D. As shown in FIG. 7, after providing the two second additional cavities 6242, the electric field intensity in the edge region of the output cavity 6220 in the direction D is enhanced, resulting in a more uniform electric field distribution in the direction D in the output cavity 6220.

In some embodiments, a structural size of the additional cavity is adjustable. For example, the side wall of the additional cavity (e.g., the additional cavity 1240, the additional cavity 2240, the first additional cavity 1241, the second additional cavity 6242, the second additional cavity 7242) may be provided with a telescopic structure. The telescopic structure refers to a structure capable of adjusting (e.g., expanding or contracting) the side wall of the additional cavity through expansion or contraction. The telescopic structure may adjust a size of the additional cavity by adjusting the side wall of the additional cavity. Specifically, the telescopic structure may expand or contract to elongate or shorten the side wall of the additional cavity. When the side wall of the additional cavity elongates, the size of the additional cavity increases, and when the side wall of the additional cavity contracts, the size of the additional cavity decreases.

In some embodiments, an expansion direction of the telescopic structure may be toward an outside of the output cavity (i.e., away from the central axis of the output cavity), and a contraction direction of the telescopic structure may be towards an inside of the output cavity (i.e., towards the central axis of the output cavity). In some embodiments, a specific expansion/contraction direction of the telescopic structure may be determined based on an extension direction of the side wall (e.g., a sub-wall) of the additional cavity. When the side wall of the additional cavity includes a plurality of sub-walls, the telescopic structure may be provided on any one of the plurality of sub-walls. In such cases, the expansion/contraction direction of the telescopic structure may be an extension direction of the sub-wall. When the side wall of the additional cavity includes a plurality of sub-walls, the telescopic structure may be provided on each of the plurality of sub-walls. In such cases, the expansion/contraction direction of the telescopic structure may be the extension direction of the corresponding sub-wall, thereby enabling adjustment of the size of the additional cavity from a plurality of directions.

In some embodiments, the telescopic structure may include a telescopic plate. The telescopic plate may include a first sub-plate and a second sub-plate. One of the first sub-plate and the second sub-plate may be connected to the side wall of the output cavity located on one side of the additional cavity, and the other of the first sub-plate and the second sub-plate may be connected to the side wall of the output cavity located on the other side of the additional cavity (or another sub-wall of the additional cavity). The first sub-plate may be provided with a slide rail, and the second sub-plate may be provided with a slider capable of sliding on the slide rail. By sliding the slider on the slide rail, the second sub-plate can move relative to the first sub-plate, allowing the side wall of the additional cavity to expand or contract.

By providing the telescopic structure on the side wall of the additional cavity to adjust the size of the additional cavity, the additional cavity becomes flexible and adjustable, allowing real-time size adjustments as needed, which enables precise adjustment of the electric field distribution inside the output cavity, thereby enhancing the adaptability and performance of the klystron, and providing a wider modulation range and sensitivity.

In some embodiments, the telescopic structure may include a corrugated plate-like structure. The corrugated plate-like structure may be a stretchable elastic structure that exhibits a corrugated shape after unfolding. The expansion and contraction principle of the corrugated plate-like structure is similar to that of the bellows. By configuring the telescopic structure as the corrugated plate-like structure, the telescopic structure becomes simple and easy to manufacture, thereby improving the production efficiency of the klystron. In addition, the corrugated plate-like structure has high elasticity and adjustability. By adjusting a shape of the corrugated plate-like structure, a shape of the additional cavity can be adjusted, thereby achieving precise adjustment of the electric field distribution in the output cavity.

In some embodiments, the telescopic structure may be a foldable plate structure. In some embodiments, the telescopic structure may be a structure in which a plurality of telescopic joints are connected, such as sleeves telescopic joints, square natural compensation expansion joints, etc. The structure in which the plurality of expansion joints are connected allows mutual movement of adjacent telescopic joints along the telescopic direction to adjust the size of the additional cavity along the telescopic direction.

In some embodiments, the klystron may be provided with a driving mechanism. The driving mechanism may be drivingly connected with the telescopic structure to drive the telescopic structure, thereby adjusting the size of the additional cavity. Merely by way of example, the driving mechanism may include a micro motor, a micro hydraulic cylinder, etc.

Figure 8:
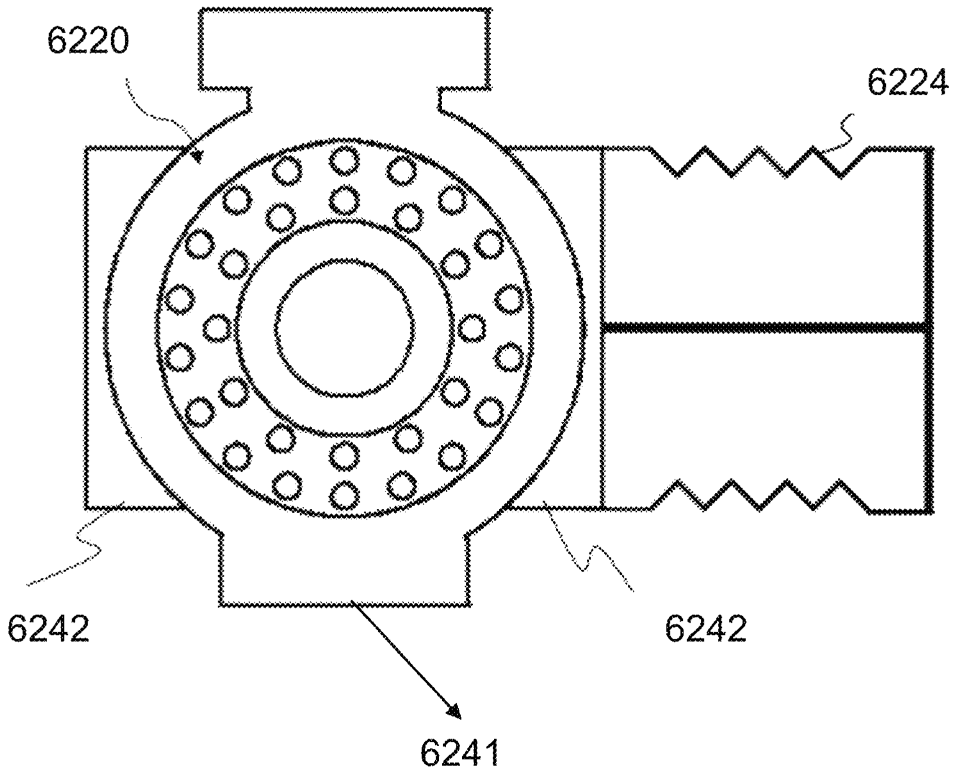
FIG. 8 is a schematic diagram illustrating a telescopic structure according to some embodiments of the present disclosure.

FIG. 8 is a schematic diagram illustrating a telescopic structure according to some embodiments of the present disclosure. FIG. 8 illustrates, as an example, the setting of a telescopic structure 6224 on the second additional cavity 6242 of the output cavity 6220 shown in FIG. 6*a*. As shown in FIG. 8, the side wall of at least one of the two second additional cavities 6242 includes the telescopic structure 6224 to adjust the size of the corresponding second additional cavity 6242. The corresponding second additional cavity 6242 refers to the second additional cavity 6242 provided with the telescopic structure 6224. In some embodiments, the first additional cavity 6241 and/or the other second additional cavity 6242 may be provided with the telescopic structure. Types and structures of the telescopic structures provided on the first additional cavity 6241 and the two second additional cavities 6242 may be the same or different. By providing the telescopic structure, the size of the first additional cavity 6241 and/or the second additional cavity 6242 can be adjusted, ensuring the uniform electric field distribution in the output cavity for various application scenarios of the klystron. In addition, providing the telescopic structure 6224 can eliminate the influence of possible machining errors of the additional cavity on the uniformity of the electric field distribution in the output cavity 6220.

In some embodiments, the klystron may be a single-beam klystron, which includes a single electron beam channel (i.e., the drift tube). An electron beam channel is a path through which the electron beam is transmitted inside the klystron, used to achieve electric field modulation and adjustment. In the single-beam klystron, there is only one electron beam channel, which generates a weak electric field and has a minor impact on the uniformity of the electric field distribution in the entire output cavity. By providing the additional cavity (e.g., the additional cavity 1240, the additional cavity 2240, the first additional cavity 1241, the second additional cavity 6242, the second additional cavity 7242), the adjustment to the electric field distribution in the output cavity can be realized.

In some embodiments, the klystron may be a multi-beam klystron, which includes multiple electron beam channels. For example, as shown in FIG. 2 and FIG. 3, the klystron 1000 includes multiple electron beam channels 1300. In the multi-beam klystron, there are multiple electron beam channels, which generate a strong electric field and have a significant impact on the uniformity of the electric field distribution in the entire output cavity. In such cases, by providing the additional cavity (e.g., the additional cavity 1240, the additional cavity 2240, the first additional cavity 1241, the second additional cavity 6242, the second additional cavity 7242), the adjustments to the electric field distribution in the output cavity can be achieved.

In some embodiments, when the klystron is the multi-beam klystron, the size of the additional cavity may ensure a uniform electric field distribution in the region where the multiple electron beam channels are located. Specifically, the size of the additional cavity may ensure that characteristic impedance (R/Q) values at center positions of the multiple electron beam channels are essentially the same. The size of the additional cavity is adjusted in a simulation, and then when the additional cavity is at different sizes, the characteristic impedance (R/Q) values at the center positions of the multiple electron beam channels are determined. The smaller a difference between the characteristic impedance (R/Q) values at the center positions of the multiple electron beam channels, the more suitable the size of the additional cavity. The characteristic impedance (R/Q) at the center position of an electron beam channel may be determined according to the following formula (1):

$$R/Q = \frac{\left(\int E_z d_z\right)^2}{2\omega W}, \tag{1}$$

where R represents a shunt impedance, Q represents a quality factor of a resonator cavity, $E_z$ represents a longitudinal electric field intensity in the electron beam channel, z represents positions of a plurality of points in the resonator cavity along an extension direction of the electron beam channel, w represents a resonant angular frequency of the resonator cavity, and W represents cavity energy storage of the resonator cavity. Herein, the resonator cavity refers to the output cavity.

It should be noted that the formula (1) may also be used to determine the characteristic impedance (R/Q) at the center positions of the electron beam channels in the input cavity (e.g., the input cavity 1210, the input cavity 2210) and/or the intermediate cavity (e.g., the intermediate cavity 1230-1, the intermediate cavity 1230-2, the intermediate cavity 2230-1, the intermediate cavity 2230-2).

By controlling the electric field distribution of each of the multiple electron beam channels, independent modulation and adjustment of a plurality of input signals can be achieved, thereby realizing more complex signal processing and modulation functions.

Figure 9:
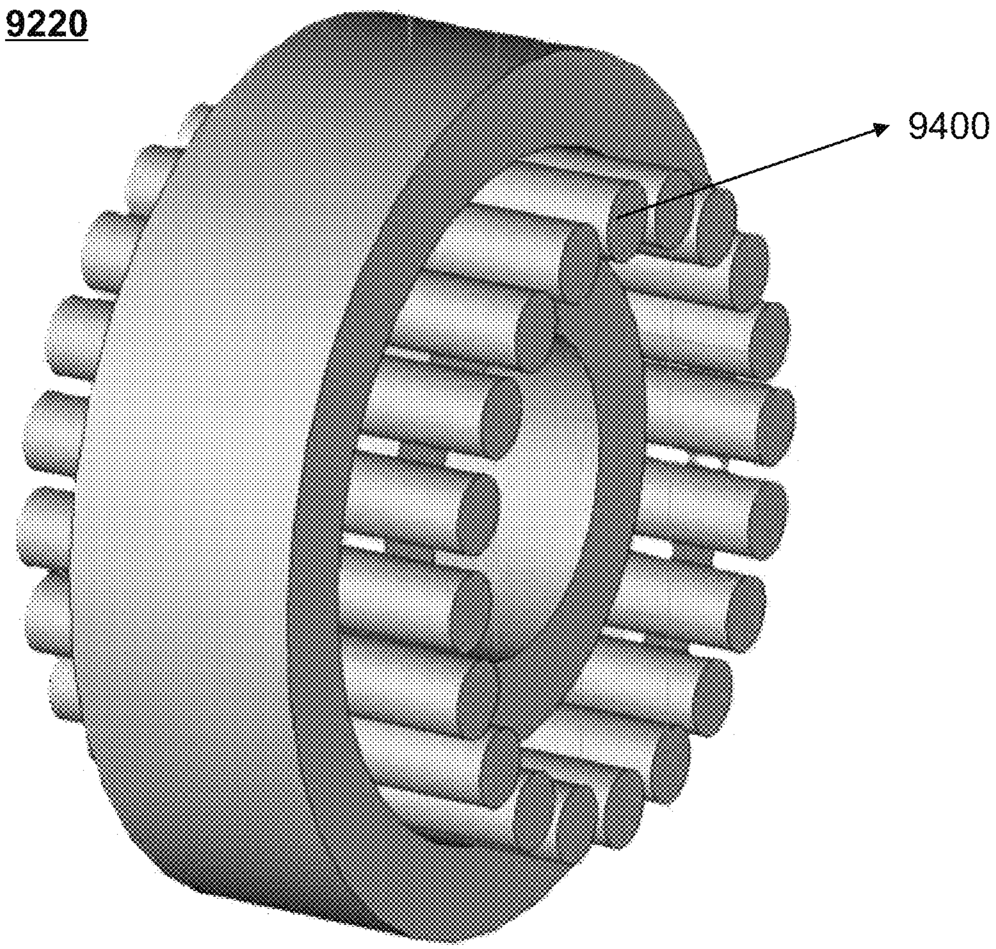
FIG. 9 is a schematic diagram illustrating a structure of an exemplary coaxial cavity according to some embodiments of the present disclosure.

In some embodiments, the output cavity may be a coaxial cavity (also referred to as a coaxial resonant cavity). The coaxial cavity may include an outer ring and an inner ring arranged coaxially. The multiple electron beam channels may surround a center axis of the output cavity and be distributed uniformly in a region between the outer and inner rings along a circumferential direction. For example, FIG. 9 is a schematic diagram illustrating a structure of an exemplary coaxial cavity 9220 according to some embodiments of the present disclosure. As shown in FIG. 9, the coaxial cavity 9220 is a hollow cylindrical cavity formed by nesting an outer ring and an inner ring, and multiple electron beam channels 9400 are distributed in a region between the outer ring and the inner ring.

Figure 10:
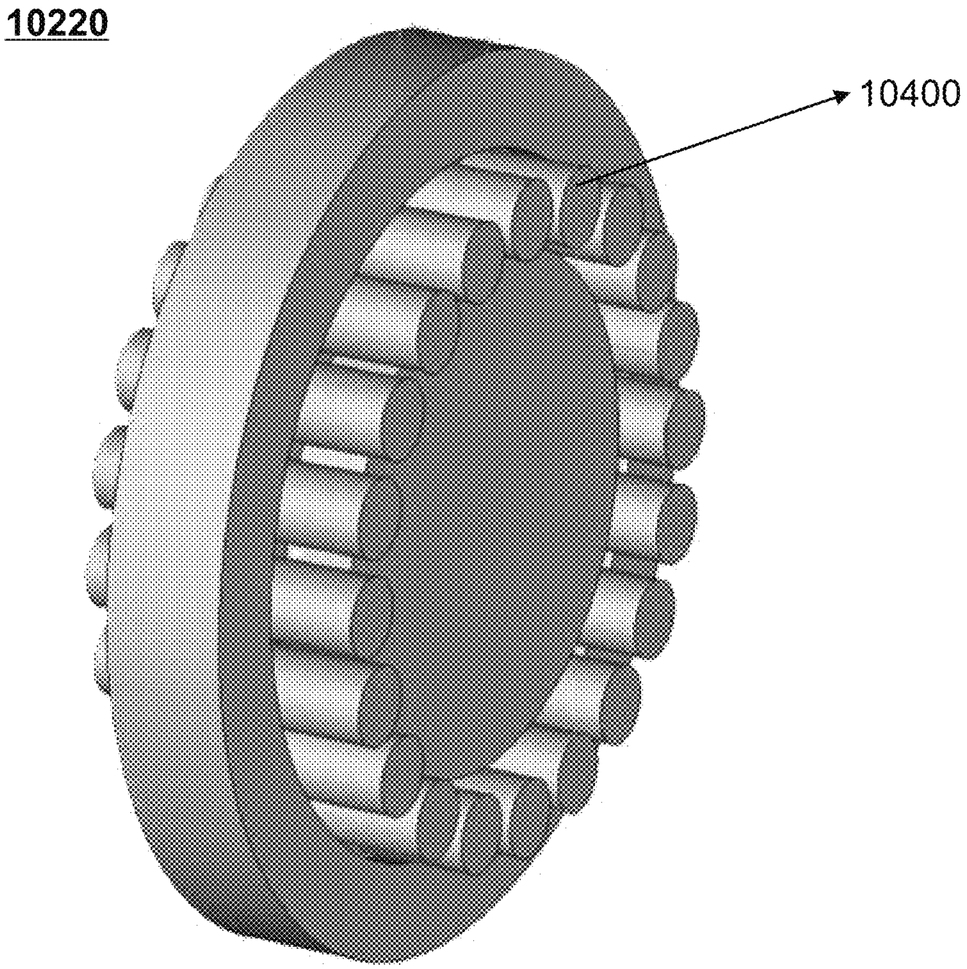
FIG. 10 is a schematic diagram illustrating a structure of an exemplary recessed re-entrant cavity according to some embodiments of the present disclosure.

In some embodiments, the output cavity may be a non-coaxial cavity. For example, the non-coaxial cavities may include a recessed re-entrant cavity and a cylindrical cavity. The recessed re-entrant cavity may include an outer ring and an inner solid cylinder arranged coaxially. The multiple electron beam channels may surround the center axis of the output cavity and be distributed uniformly in a region between the outer ring and the inner solid cylinder along the circumferential direction. For example, FIG. 10 is a schematic diagram illustrating a structure of an exemplary recessed re-entrant cavity 10220 according to some embodiments of the present disclosure. As shown in FIG. 10, the recessed re-entrant cavity 10220 is a cavity formed by nesting an outer ring and an inner solid cylinder, and multiple electron beam channels 10400 are distributed in a region between the outer ring and the inner solid cylinder. The recessed re-entrant cavity has a high degree of electron bunching and a highly dense electric field. In some embodiments, the output cavity may be a double-sided recessed re-entrant cavity.

Figure 11:
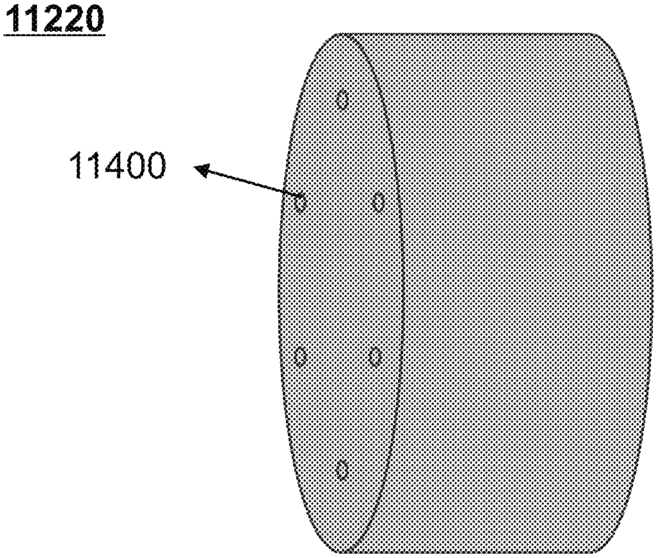
FIG. 11 is a schematic diagram illustrating a structure of an exemplary cylindrical cavity according to some embodiments of the present disclosure.

The cylindrical cavity may be a solid cylinder. The multiple electron beam channels may surround the center axis of the output cavity and be distributed uniformly inside the solid cylinder along the circumferential direction. For example, FIG. 11 is a schematic diagram illustrating a structure of an exemplary cylindrical cavity 11220 according to some embodiments of the present disclosure. As shown in FIG. 11, the cylindrical cavity 11220 is a solid cylinder, and multiple electron beam channels 10400 are located inside the solid cylinder.

In some embodiments, the klystron may include an output cavity, an output waveguide, and a coupling port. The output cavity is connected to the output waveguide through the coupling port, wherein the output cavity includes a first space and a second space, the first space is configured for movement of electron beam, the second space deviates from a movement path of the electron beam, and protrudes outward from a side wall of the output cavity.

The first space refers to a space in the additional cavity where the electron beam needs to pass through during moving. In some embodiments, the first space is configured for the movement of electron beam.

The second space refers to a space in the additional cavity where the electron beam does not need to pass through during movement. In some embodiments, the second space may deviate from the electron beam movement path setting to adjust the electric field distribution in the output cavity. In some embodiments, the second space may be set to protrude outward from the side wall of the output cavity. In some embodiments, the second space may be an additional cavity. For more information on the output cavity, output waveguide, coupling port, and additional cavity, please refer to the relevant descriptions in FIGS. 1*a* to 8.

The possible beneficial effects achieved by the embodiments of the present disclosure may include the following. 1) Providing the additional cavity on the side wall of the output cavity of the klystron can make the electric field distribution in the output cavity more uniform. 2) By providing the first additional cavity, the electric field distribution in the first radial direction of the output cavity becomes more uniform, thereby improving the stability and modulation performance of the klystron. 3) By providing the at least two second additional cavities, the electric field distribution in the second radial direction of the output cavity becomes more uniform, thereby improving the stability and modulation performance of the klystron. 4) By simultaneously providing the first additional cavity and the at least two second additional cavities, the electric field distribution in both the first and second radial directions of the output cavity becomes more uniform, which enhances the uniformity of the electric field distribution in the output cavity, thus improving the stability and modulation performance of the klystron. 5) The use of the telescopic structure allows for precise adjustment of the size of the first additional cavity and/or the at least two second additional cavities according to actual conditions, thereby enabling precise control of the uniformity of the electric field distribution in the output cavity.

It should be noted that different embodiments may result in different beneficial effects. In different embodiments, the beneficial effects that may be achieved may be any combination of the above or other possible beneficial effects that may be obtained.

In some embodiments, the klystron described in any one of the embodiments above may be applied to the field of radiotherapy (RT). For example, some embodiments of the present disclosure provide a medical electron linear accelerator, which may include the klystron described in any one of the embodiments above. By using the klystron described in any one of the embodiments above, the stability and efficiency of the medical electron linear accelerator can be effectively improved.

In some embodiments, the medical electron linear accelerator may further include a controller and an electric field intensity measuring device. The controller may be communicatively connected to the electric field intensity measuring device. The electric field intensity measuring device may detect the electric field distribution of the output cavity of the klystron and feed the electric field distribution back to the controller. In some embodiments, the controller may be communicatively connected to the driving mechanism that drives the telescopic structure (e.g., the telescopic structure 6224). Based on the electric field distribution detected by the electric field intensity measuring device, the controller may control the driving mechanism to drive the telescopic structure to expand or contract, thereby adjusting the electric field distribution of the output cavity. For example, when the electric field intensity measuring device detects that the electric field intensity is stronger in a region near the coupling port of the output cavity and weaker in a region near the additional cavity, the controller may drive the telescopic structure to expand to increase the size of the additional cavity, which can enhance the electric field intensity in the region near the additional cavity, thereby making the electric field distribution in the output cavity more uniform.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.), or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A computer-readable signal medium may include a propagated data signal with computer-readable program code embodied therein, for example, in a baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction-performing system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python, or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term “about,” “approximate,” or “substantially.” For example, “about,” “approximate,” or “substantially” may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A klystron comprising an output cavity, an output waveguide, and a coupling port, the output waveguide being connected to a side wall of the output cavity through the coupling port, wherein an additional cavity is provided on the side wall of the output cavity, the additional cavity is connected with the output cavity and extends from a position connected to the output cavity in a direction away from a central axis of the output cavity.

2. The klystron of claim 1, wherein the additional cavity is configured to cause a position where an electric field intensity in the output cavity is maximum to move towards the additional cavity.

3. The klystron of claim 1, wherein the additional cavity includes a first additional cavity, and the first additional cavity and the coupling port are located opposite to each other on two sides of the central axis of the output cavity.

4. The klystron of claim 3, wherein a deviation between a size of the additional cavity and a size of the coupling port is less than or equal to a preset threshold.

5. The klystron of claim 4, wherein a length of the additional cavity along an axial direction of the output cavity is equal to a length of the coupling port along the axial direction of the output cavity.

6. The klystron of claim 1, wherein the additional cavity includes at least two second additional cavities, and two of the at least two second additional cavities are located opposite to each other on two sides of the central axis of the output cavity.

7. The klystron of claim 6, wherein the at least two second additional cavities and the coupling port are spaced from each other in a same distance along a circumferential direction of the output cavity.

8. The klystron of claim 6, wherein the additional cavity further includes a first additional cavity, and the two of the at least two second additional cavities are respectively located on two sides of the first additional cavity in a circumferential direction of the output cavity.

9. The klystron of claim 1, wherein a structural size of the additional cavity is adjustable.

10. The klystron of claim 9, wherein the telescopic structure includes a corrugated plate-like structure.

11. The klystron of claim 1, wherein the klystron includes a plurality of output waveguides, a plurality of coupling ports, and a plurality of additional cavities, wherein the plurality of coupling ports are arranged in one-to-one correspondence with the plurality of output waveguides.

12. The klystron of claim 1, wherein a contour of a cross-section of a side wall of the additional cavity perpendicular to an axial direction of the output cavity includes at least one of a curved line contour or a straight line contour.

13. The klystron of claim 1, wherein a contour of a cross-section, perpendicular to an axial direction of the output cavity, of a region enclosed by one or more side walls of the additional cavity is polygonal, arcuate, or fan-shaped.

14. The klystron of claim 1, wherein the klystron is a multi-beam klystron including multiple electron beam channels.

15. The klystron of claim 1, wherein the klystron is a single-beam klystron including a single electron beam channel.

16. The klystron of claim 1, wherein the output cavity is at least one of a coaxial cavity, a recessed re-entrant cavity, or a cylindrical cavity.

17. A klystron comprising an output cavity, an output waveguide, and a coupling port, the output cavity being connected to the output waveguide through the coupling port, wherein the output cavity comprises a first space and a second space, the first space is configured for movement of electron beam, the second space deviates from a movement path of the electron beam, and protrudes outward from a side wall of the output cavity, wherein the second space is in an additional cavity, the additional cavity includes a first additional cavity, and the first additional cavity and the coupling port are located opposite to each other on two sides of a central axis of the output cavity.

18. A medical electronic linear accelerator comprising a klystron, wherein the klystron comprises an output cavity, an output waveguide, and a coupling port, the output waveguide is connected to a side wall of the output cavity through the coupling port, wherein an additional cavity is provided on the side wall of the output cavity, the additional cavity is connected with the output cavity and extends from a position connected to the output cavity in a direction away from a central axis of the output cavity.

19. The klystron of claim 17, wherein the additional cavity includes at least two second additional cavities, and two of the at least two second additional cavities are located opposite to each other on two sides of the central axis of the output cavity.

* * * * *